(12) United States Patent
Martinez De Lizarduy Romo et al.

(10) Patent No.: US 7,677,869 B2
(45) Date of Patent: Mar. 16, 2010

(54) MONITORING AND DATA PROCESSING EQUIPMENT FOR WIND TURBINES AND PREDICTIVE MAINTENANCE SYSTEM FOR WIND POWER STATIONS

(75) Inventors: Maria Jose Martinez De Lizarduy Romo, Pamplona (ES); Jose Ignacio Llorente Gonzalez, Pamplona (ES)

(73) Assignee: Gamesa Innovation & Technology, S.L., Pamplona (Navarra) (ES)

(*) Notice: Subject to any disclaimer, the term of this patent is extended or adjusted under 35 U.S.C. 154(b) by 981 days.

(21) Appl. No.: 10/578,825

(22) PCT Filed: Nov. 12, 2004

(86) PCT No.: PCT/ES2004/000502
§ 371 (c)(1),
(2), (4) Date: May 9, 2006

(87) PCT Pub. No.: WO2005/047999
PCT Pub. Date: May 26, 2005

(65) Prior Publication Data
US 2007/0140847 A1    Jun. 21, 2007

(30) Foreign Application Priority Data
Nov. 14, 2003    (EP) ............... 03380264

(51) Int. Cl.
*F03D 7/00*    (2006.01)

(52) U.S. Cl. ............... 416/37; 416/36; 416/44; 416/61

(58) Field of Classification Search .......... 416/1, 416/31, 36–38, 44, 61; 290/44, 55
See application file for complete search history.

(56) References Cited

U.S. PATENT DOCUMENTS

| 7,160,083 B2 * | 1/2007 | Pierce et al. ........ 416/61 |
| 2004/0108729 A1 | 6/2004 | Wobben |
| 2004/0112131 A1 | 6/2004 | Wobben |

FOREIGN PATENT DOCUMENTS

| DE | 101 13 038 | 10/2002 |
| DE | 101 13 039 | 10/2002 |
| WO | 83/01490 | 4/1983 |
| WO | 99/57435 | 11/1999 |

* cited by examiner

*Primary Examiner*—Christopher Verdier
(74) *Attorney, Agent, or Firm*—Ladas & Parry LLP (57) ABSTRACT

A predictive maintenance system for wind parks, the wind park comprising a group of wind turbines (Ai), a communications network (RS), and a supervision and control system (ST). The predictive maintenance system comprises a monitoring and processing equipment (SMP) connected to the control system (PLC) of the wind turbine (Ai), such that the monitoring and processing equipment sends alarms through the control system of the wind turbine to the supervision and control system. A monitoring and processing equipment (SMP) for wind turbines is also disclosed.

12 Claims, 5 Drawing Sheets

MONITORING AND DATA PROCESSING EQUIPMENT FOR WIND TURBINES AND PREDICTIVE MAINTENANCE SYSTEM FOR WIND POWER STATIONS

FIELD OF THE INVENTION

The present invention is comprised within the predictive maintenance systems applicable to wind turbines forming part of a wind park.

BACKGROUND OF THE INVENTION

Basically, a wind turbine produces electricity in the following manner: the wind makes the rotor of the wind turbine rotate, which causes the rotation of a generator (a dynamo) producing electricity.

The main components of the nacelle of a wind turbine are:
Rotor: it is constituted of several blades collecting the wind; it is screwed to the main shaft.
Main shaft: between rotor and step-up gear.
Step-up gear: connected between the rotor (at the other end of the main shaft) and the electricity generator.
Electricity generator.
Ring system: allows rotation of the necelle in order to face the wind according to the signal of the wind vane connected to the control system.
Control system: controls the majority of the parts of the wind turbine; thus, for example, it controls the ring system.

A wind park is made up of one or more wind turbines (up to hundreds) and other elements such as a transformation center or electric substation, and one or more meteorological towers. All these elements are normally supervised by a park supervision and control system (or remote control) installed in a central computer located in the wind park itself and connected to the wind turbines through a local communications network. The application installed in this central computer collects the operation variables of said elements, as well as the alarms produced in them.

The difficulty of applying traditional predictive maintenance techniques in wind turbines is mainly based on the following aspects:
a) the need to install a large amount of predictive equipment- one per machine-and, therefore, the generation of large amounts of information which will be necessary to process in order to detect possible problems;
b) the difficulty in accessing the data due to the location of the prediction equipment— located in the nacelle of each wind turbine and the wind turbines, in turn, in locations far from urban centers—;
c) the need to simplify maintenance and minimize the cost of each system; and,
d) the need to condition signal capturing to a specific operating condition of the wind turbine and that this operating is maintained during signal capturing for the purpose of eliminating noises introduced by transient behaviors of the wind turbine, and to obtain useful information on the condition of the critical components of the wind turbine.

DESCRIPTION OF THE INVENTION

The invention refers to a monitoring and processing equipment for wind turbines, and to a predictive maintenance system for wind parks. Preferred embodiments of the equipment and system are defined in the dependent claims.

The predictive maintenance system of the invention solves the drawbacks mentioned above, and it does so through a system which uses the usual infrastructures in wind parks and which drastically decreases the need to dedicate resources to analyzing the information as a result of its conditioned and stable monitoring and to its processing capability.

The predictive maintenance system of the invention is based on vibration analysis, optimized for wind turbines.

The main objective of the predictive maintenance system in wind turbines is the premature detection of deteriorations, defects and failures in the following critical components of the wind turbine: main shaft, step-up gear and generator.

It is an objective of the present invention to provide a minimum maintenance and low cost equipment, easily integrated in the nacelle of the wind turbine, with data processing capability and autonomous detection of alarms related to the condition of the critical mechanical components of the wind turbine, and capable of reporting them, through the park communications system, to the usual supervision and control system, without needing to have specific auxiliary software in the park itself.

The predictive maintenance system of the invention is applicable to wind parks, the wind park comprising at least one wind turbine which, in turn, as previously indicated, includes a control system as one of its main components providing operation variables of the wind turbine.

The invention refers to a monitoring and processing equipment for a wind turbine, the wind turbine including a control system, and the monitoring and processing equipment being configured according to the type of wind turbine in which it is installed.

The equipment of the invention comprises:
connection means with said control system of the wind turbine, and
connection means with a group of accelerometers placed in pre-established components of the wind turbine, said monitoring and processing equipment being configured to start capturing signals of the group of accelerometers as long as the predetermined operation variables of the wind turbine, received from the control system, are within a predetermined operating range, and said monitoring and processing equipment being configured to complete said signal capturing as long as the value of said operation variables produced in taking the measurements does not vary, during the entire signal capturing, beyond upper and lower limits configured in the equipment.

processing means for processing the captured signals of the accelerometers to obtain a set of overall variables associated to the captured signals, and
means for generating alarms related to failures or malfunctionings of the mechanical components of the wind turbine.

The pre-established components of the wind turbine are preferably the main shaft, step-up gear and generator.

The predetermined operation variables of the wind turbine which determine the sampling of the signals of the accelerometers are, preferably, the instantaneous power produced by the wind turbine, the revolutions per minute of the generator, and the rotation of the ring.

The predetermined operation ranges of said variables considered valid for capturing signals are preferably defined according to rated features (for example, rated power) of the wind turbine; it can generally be considered that they are approximately in the range corresponding to the operation of the wind turbine at a little over half of its rated power.

The operation ranges lower than that defined are not suitable for detecting problems in the mechanical components since the latter are not subjected to the load necessary for obtaining useful information from an analysis of the measurement.

The operation ranges greater than that defined are not suitable for detecting problems in the mechanical components since, due to the operation of the control system of the wind turbine, the measurements are greatly scattered.

Nor are measurements of the accelerometers taken when the ring of the nacelle is rotating, since the teeth of the gears can cause blows due to allowances which distort the measurement of the signal.

During the capturing process of the signal of the accelerometers, the values of the variables which determined the start of sampling should not vary beyond upper and lower limits which, for each operation variable, are determined by a percentage of the initial value of the variable, which shall be called stable operating conditions. In case this condition is not complied with, the sample is discarded.

Therefore, the system of the invention carries out continuous monitoring of critical components, preferably the main shaft, step-up gear and generator, and this monitoring is:
  conditioned: to the operating condition of the machine, facilitated by the control system of the wind turbine; and
  stable: the operating conditions must be maintained during the complete sampling.

As previously indicated, to process the captured signals of the accelerometers, the monitoring equipment is provided with processing means for processing the captured signals of the accelerometers, preferably comprising:
  means for conditioning the signal, preferably: anti-aliasing filtering, signal digitalization, application of FFT (Fast Fourier Transforms) for obtaining the signal spectrum;
  means for calculating a series of overall values, which are preferably: crest factor, overall RMS (root-mean-square) of the signal, RMS of frequency bands;
  means for carrying out a level alarm detection algorithm; and
  means for carrying out a tendency alarm detection algorithm.

The means for generating alarms of the monitoring and processing equipment of the invention include means for generating alarms as a result of the application of the two previous alarm detection algorithms.

Preferably, capturing the signal of the accelerometers consists of capturing three consecutive signal samples: one for high-frequency processing, one for low-frequency processing, and one for digital filtering processing.

The parameters of the alarm detection algorithms as well as the definition of the maximum frequencies, frequency bands and other values can be configured in the monitoring and processing equipment.

The monitoring and processing equipment of the invention preferably includes storage means for storing the information introduced in or generated by the monitoring and processing equipment itself. This information includes the data obtained from the processing, such as the spectra, overall values, alarms and sampling conditions, operation variables of the wind turbine, complete configuration of the equipment and overall variable and alarm recordings.

In other words, this storage preferably consists of:
  storing the spectra, together with the overall values associated to each spectrum and together with the operation variables of the wind turbine triggering data collection;
  storing the alarms generated after the application of the two alarm detection algorithms mentioned.

The policies for storing this information can be configured in the monitoring and processing equipment itself according to the processing and analysis needs; they can be the following:
  number of spectra to store: all of them, the last n days, the last n days every x hours;
  number of overall variables to store: all of them, the last n days, the last n days every x hours;
  number of alarms to store: number of spectra associated to the alarm.

The invention also refers to a predictive maintenance system for wind parks, the wind park comprising a group of wind turbines, a communications network and a supervision and control system.

This predictive maintenance system comprises:
  a monitoring and processing equipment as described in the present specification, which is connected to the control system of the wind turbine, such that the monitoring and processing equipment is configured to send alarms through the control system of the wind turbine to the supervision and control system.

The predictive maintenance system of the invention is integrated in the information system using the available infrastructures for sending the information generated by the monitoring and processing equipment itself; this equipment is installed in the nacelle of the wind turbine, and is connected to the control system of the wind turbine which, in turn, is usually connected to the park supervision system and, therefore, does not need any computer or any application additional to the usual supervision and control system of the park. The monitoring and processing equipment is capable of sending alarms through the control system of the wind turbine to the usual supervision and park control system, these alarms being able to be represented in said system in the same manner as the rest of those generated by other elements such as, for example, the control system itself of the wind turbines.

In other words, to inform the operators of the processing result of the captured signals and of the possible detection of alarms, the monitoring and processing equipment sends the calculated overall values and alarms generated by the equipment to the normal park supervision system, through the control system of the wind turbine, using the existing infrastructures and thus achieving integration with the information system of the wind park; and in case there is an Ethernet communications network in the park, it sends the complete data (spectra, overall values and alarms) package to vibration analysis means configured for allowing skilled persons in vibration analysis to investigate in detail the information provided by the monitoring equipment.

With regard to the analysis of the information extracted from the predictive equipment, the predictive maintenance system has expert software installed in the computers of engineers skilled in spectral and vibration analysis, and which allows carrying out any type of analysis on the data collected from the predictive equipment installed in each wind turbine.

The information is sent outside of the wind turbine through one or more channels, depending on the configuration of the park:
  If the park has a series network which the supervision system is connected to, the alarms and the overall values and the sampling conditions (but not the spectra, due to their large size) are transmitted to the wind park supervision system through the PLC of the wind turbine. The alarms will be integrated like the rest of the alarms of the park in the supervision application. In the case of parks with networks based on series protocols, if it is determined from the analysis of the overall values collected in the park supervision computer that it is necessary to carry out a more in-depth analysis, it may be necessary to go to the wind turbine which generated the alarm to download the spectra associated to said alarm (which are stored in the monitoring equipment storage means).

If there is an Ethernet network in the park, in addition to sending the alarms and overall values to the park supervision system through the PLC, all the information associated to the measurement (spectra, overall values, alarms and sampling conditions) will be sent to a data storage area installed in a specific computer of the park. Thus, the analysis means, which are preferably installed outside of the park (in the maintenance offices) allow persons skilled in vibrations to carry out the analysis of spectra, overall variables and alarms generated by the monitoring equipment installed in each wind turbine of the park.

The predictive maintenance system is provided with a specific application which allows it to carry out the following tasks on the predictive equipment installed in the wind turbine:

Complete configuration of the monitoring and processing equipment, which includes parameters such as: valid signal capturing ranges and stable operating conditions definition; IP address of the equipment; maximum frequencies, number of lines and bands defined for the high, low frequency processing and digital filtering; policy for storing information in the equipment; parameters of the level and tendency alarm detection algorithms; features of the accelerometers; features of the step-up gear; features of the generator, and others.

Continuous collection of information of the predictive equipment, mainly, condition of the equipment, state of communications, state of the sensors, overall variables, spectra, alarms generated, and overall variable and alarm recordings.

The specific application for the equipment system of the predictive maintenance system mentioned in the previous point allows carrying out a set of tasks on the data collected from the predictive maintenance systems installed in the wind turbines, some of which are:

creation of the hierarchy of elements related to the predictive system— wind turbines, monitoring and control equipment, accelerometers—, definition of access profiles and exploitation of data, generation of predictive equipment configuration profiles according to machine type, features of the critical components, analysis of tendencies of the overall variables of the predictive equipment, spectral analysis of the spectra collected from the predictive equipment, data comparisons.

The system of the invention can therefore be integrated with the control system or PLC already existing in current wind turbines, as well as with the communications networks existing in wind parks and with the wind park supervision system. Thus, without needing a manual processing nor special expert applications, it is possible to detect problems in the critical components and to present these problems together with part of the information which detected them in the usual systems installed in the parks and which are those facilitating the normal operation and exploitation of the wind parks.

The following advantages can be pointed out among the important advantages associated to the installation of a predictive maintenance system in wind turbines:

corrective maintenance reduction, protection for the rest of the components of the wind turbine, increase of the useful life of the wind turbine and improvement of its operation.

The following advantages can be pointed out among the important advantages associated to the installation of the system of the invention:

minimum maintenance and low cost equipment completely integrated with the rest of the components of the wind turbine;

continuous monitoring capability, filtering the signal capturing according to the operation of the wind turbine, which drastically reduces the amount of irrelevant information to process;

capability of the equipment installed in the wind turbine to carry out a comprehensive processing of the signals collected and to detect alarms associated to problems in critical components of the wind turbine, drastically reducing the amount of resources to dedicate to analyzing the information obtained;

capability to integrate the equipment in the usual wind park supervision system, which allows using the usual operation and exploitation of the wind park without needing to dedicate resources or specific systems for managing the predictive system.

BRIEF DESCRIPTION OF THE DRAWINGS

A series of drawings are very briefly described below which aid in better understanding the invention, and which are expressly related to one embodiment of said invention which is presented as a non-limiting example thereof.

DESCRIPTION OF A PREFERRED
EMBODIMENT OF THE INVENTION

Figure 1:
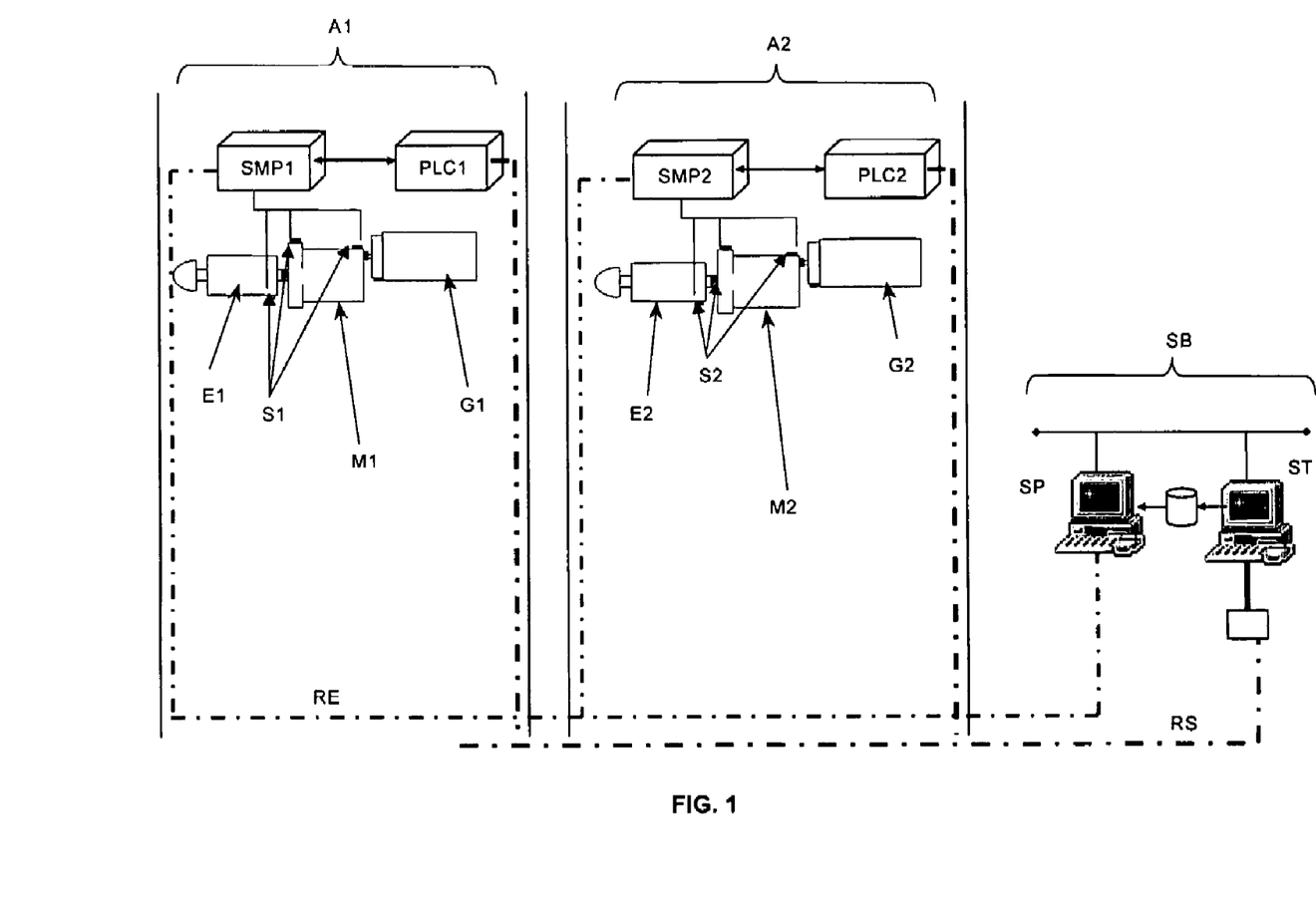
FIG. 1 shows a scheme of a wind park.

FIG. 1 shows a simple scheme of a wind park; to prevent complexity of the drawing, two wind turbines A1 and A2 and one transformation center or electric substation SB are shown in this park. The different elements of the park are supervised by a park supervision and control system (or remote control) ST installed in a central computer located in the wind park and connected to the wind turbines through a local communications network RS, for example to an RS-232 network. The application installed in this central computer collects the operation variables of the elements of the park as well as the alarms occurring in them. The park can additionally have a communications network via Ethernet RE. And in the park substation SB, in addition to the supervision system ST, there can be a computer SP in which the expert software is included so that engineers skilled in spectral and vibration analysis can carry out any type of analysis on the data collected from the monitoring and processing equipments SMPi installed in each wind turbine Ai.

For each wind turbine Ai in this figure, only the critical components in which the accelerometers Si are installed are shown: shaft Ei, step-up gear Mi and generator Gi.

The monitoring and processing equipment is installed in the nacelle of the wind turbine, and is connected to the control system PLCi of the wind turbine; the latter, in turn, is connected to the park supervision system ST; therefore, no computer or special application additional to the normal park supervision and control system is needed, the monitoring and processing equipment SMPi being capable of sending the alarms through the control system PLCi of the wind turbine to the normal park supervision and control system, said alarms being able to be represented in said system in the same manner as the rest of the alarms generated in the park by other elements.

Thus, the predictive maintenance system of the invention is integrated in the information system using the infrastructures already available for sending the information generated by each monitoring and processing equipment SMPi.

Figure 5:
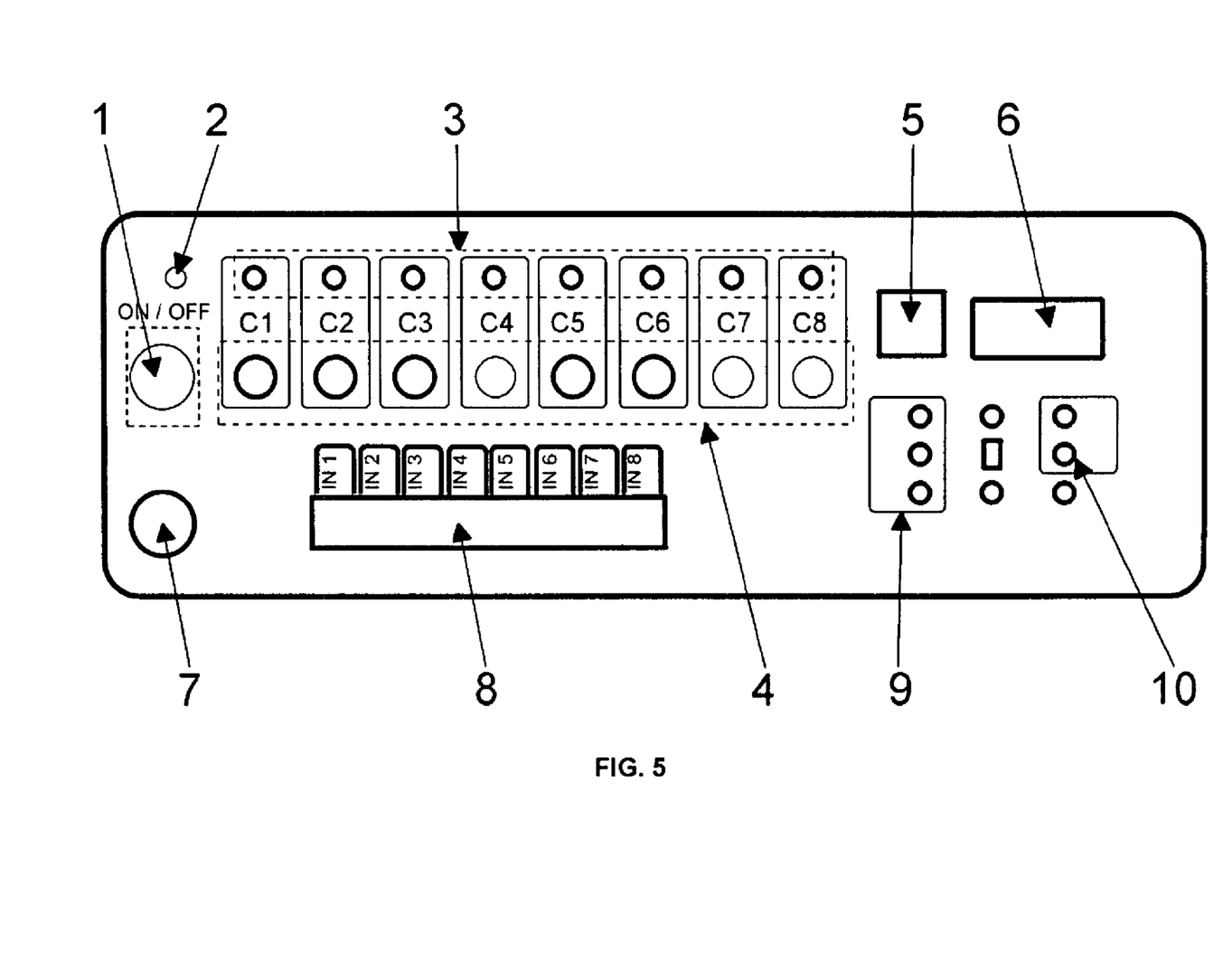
FIG. 5 shows an embodiment of the front portion of the monitoring and processing equipment.

One embodiment of this monitoring and processing equipment SMPi is shown in FIG. 5.

It is a small equipment, of the approximate size of an A4 sheet of paper about 10 cm thick, and of little weight (approximately 2 kg). It can be integrated in the switch board cubicle installed in the nacelle of the wind turbine, and it uses cooling, heating and feed of said switch board cubicle.

It has an on and off switch 1, as well as an LED 2 indicating the condition of the equipment (on or off). It has a group of 8 LEDs 3 which report the state of the accelerometers. The equipment SMPi is provided with eight channels 8 which the accelerometers are connected to; thus, the equipment has the capability to receive information from eight sensors.

In the present embodiment, it has been indicated (FIG. 1) that there are six accelerometers Si (one in the main shaft, three in the step-up gear and two in the generator), therefore two channels remain free.

The equipment also has eight connectors 4 for connecting apparatuses foreign to the system of the invention (commercial apparatuses), for the purpose of contrasting and checking the information collected by the accelerometers; it is one way of having a second "redundant" information about the signal of the accelerometers, and to be able to analyze it (for example, for vibration data collection) with commercial apparatuses.

The equipment is also provided with an Ethernet connection port 5, as well as an RS-232 connection port 6 (9 pins) for connecting with the PLC of the wind turbine.

It has a feed connector 7 (24 V), and a group of LEDs 9 and 10 indicating the state of Ethernet and RS-232 communications, respectively. It has configuration capability for both the connector port 5 and series port 6.

It is internally provided with a DSP signal processing processor and a microchip with the TCT/IP communications stack, as well as a processor intended for communications.

Figure 2:
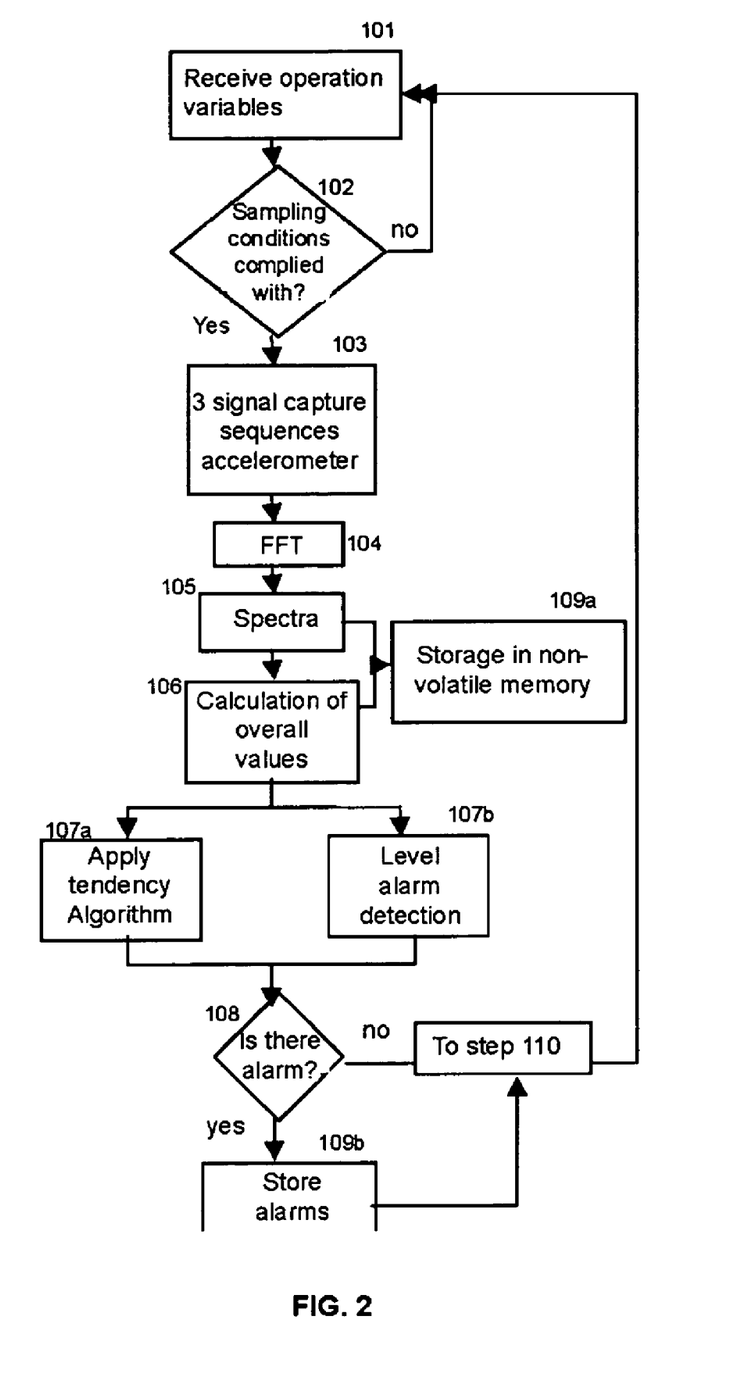
FIGS. 2 and 3 show flowcharts of the operation of the predictive maintenance system according to a preferred embodiment thereof.

An example of operation of the equipment and system of the invention (the main steps of which are schematically shown in FIG. 2) is explained below.

Suppose an equipment SMP is installed in the nacelle of an 8501 kw rated power wind turbine and is connected to its control system PLC.

Suppose that said equipment is configured with the following operation ranges for the variables of the wind turbine:
  instantaneous power
    valid range=[550, 600]; stable operating conditions=5%
  revolutions per minute of the wind turbine
    valid range=[1600,1640]; stable operating conditions=1%

The parameters of the level alarm detection algorithm, of the tendency alarm detection algorithm and the information storage policy in the equipment are also configured.

Once the equipment is configured, continuous monitoring of the critical components begins. The PLC is in continuous communication with the monitoring equipment of the system of the invention; the PLC continuously sends, for example every 200 ms, information about the operation variables (step 101) to said equipment, in addition to certain additional information such as the date and time of the PLC and the produced accumulated power.

At a given time, the PLC sends the following values to the predictive equipment:
  instantaneous power=575 kw
  rpm of the generator=1615; and
  rotation of the ring=stopped.

In this case, the capturing conditions of the signal of the accelerometers (step 102) are complied with, and the equipment begins said process; this lasts approximately 8 seconds and consists of three signal samples (step 103), each one of them simultaneously collects data of the accelerometers connected to the equipment: one for high-frequency analysis, one for low-frequency analysis and the last one for digital filtering.

Suppose that in the next instant (200 ms later), while the equipment is in the sampling process, the PLC sends the following values:
  instantaneous power=580;
  rpm of the generator=1635 and
  rotation of the ring=stopped.

The rotation of the ring is still stopped; the variation of the instantaneous power value is less than the 5% configured for this machine, but the variation of the rpm value is greater than the 1% established for the configuration. In this case, the equipment would discard the captured signal since it was not taken in stable operation conditions during the entire sampling process.

Suppose again that the PLC sends values within the operation range and that these values are maintained stable during the entire sampling process such that signal capturing is successfully completed.

In this case, the equipment would begin the process of processing the sampled signal. The measured signal is first filtered with an anti-aliasing filter, the signal is digitalized, a series of filters are applied, and the spectrum is finally obtained by applying the FFT to the sampled signal (steps 104 and 105). Then, the calculations of the overall variables (step 106) of the spectrum obtained will begin: crest factor, overall RMS and RMS of different frequency bands. Once these values are obtained, approximately 21 values, the level alarm detection algorithm (step 107a) would be activated on the basis of a series of configured parameters, such as, for example, the number of samples which must exceed the assigned value in order to trigger an alarm. Then, the tendency alarm detection algorithm (step 107b) would be carried out. Suppose that the equipment detects an alarm (step 108).

Once the process has concluded, all the information associated to this sampling is stored in a non-volatile memory (steps 109a and 109b) of the equipment itself, according to the storage policy configured in the equipment. The information will consist of the spectrum, associated overall values, associated alarms and operation values of the wind turbine which determined the sampling which include the date and time.

Figure 3:
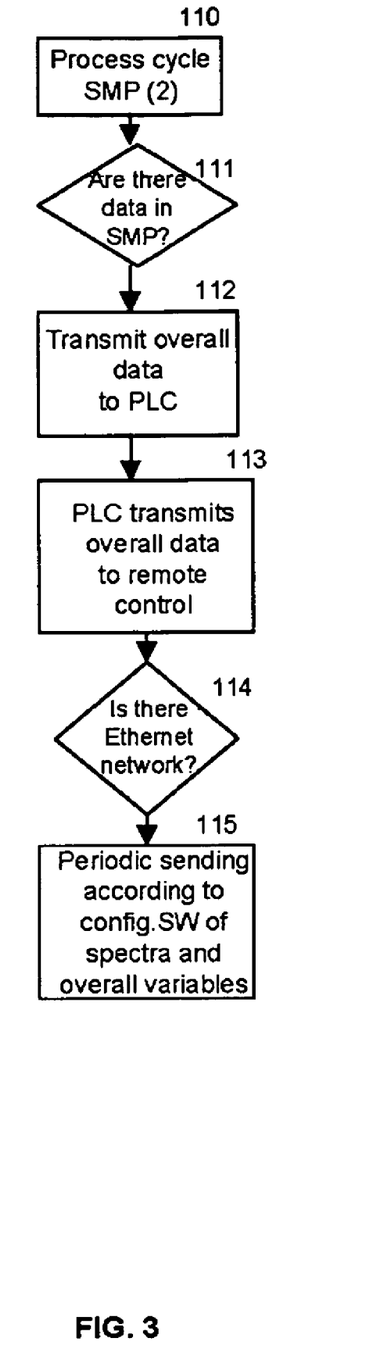

The information is sent outside of the wind turbine through one or more channels (as schematically shown in FIG. 3).

Thus, once a signal capturing process is in process (step 110), if there are data to send (step 111), this information is sent, depending on the configuration of the park:

If the park only has the series network RS which the supervision system is connected to, the alarms and overall values and the sampling conditions (but not the spectra, due to their large size) are transmitted to the wind park supervision system ST through the PLC of the wind turbine (steps 112 and 113). The alarms will be integrated like the rest of the alarms of the park in the supervision application. In the case of parks with a network based on a series protocol, if it is determined from the analysis of the overall values collected in the park supervision computer that it is necessary to carry out a more in-depth analysis, it may be necessary to go to the wind turbine which generated the alarm to download the spectra associated to said alarm (which are stored in the monitoring equipment storage means).

If there is also an Ethernet network RE (step 114) in the park, in addition to sending the alarms and overall values to the park supervision system through the PLC, all the information associated to the measurement (spectra, overall variables, alarms and sampling conditions) will be sent (step 115) to a data storage area installed in a specific computer of the park. Thus, the computer SP containing the analysis software allows experts in vibrations to carry out the analysis of spectra, of overall variables and of alarms generated by the monitoring equipment installed in each wind turbine of the park.

Figure 4:
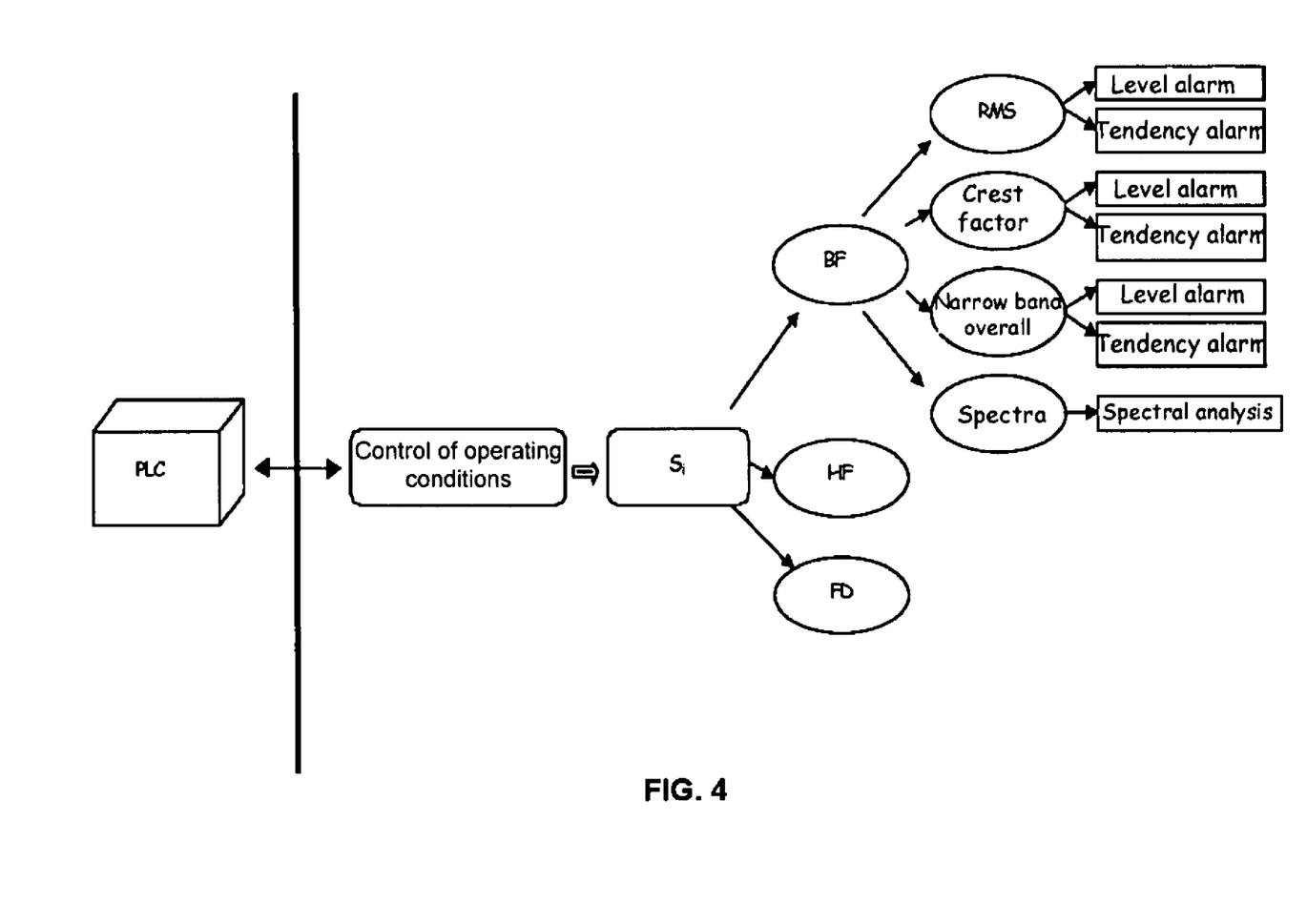
FIG. 4 shows a scheme of the processing type and detection of alarms of the system of the invention.

FIG. 4 shows in a schematic and simplified manner the processing for calculation of the overall variables and detection of alarms of the system of the invention; to prevent complicating the drawing, only the low-frequency sequence has been shown; the development of the chart is analogous for the rest of the branches (high frequency and demodulation).

When the control system PLC indicates that the operation conditions of the wind turbine are suitable, the accelerometers begin signal capturing: one for high-frequency analysis HF, one for low-frequency analysis BF, and the last one for digital filtering FD or demodulation. As previously indicated, for each one of these three samples, the following are calculated: spectra, overall RMS, crest factor and RMS of different frequency bands, and for each case, level and tendency alarm detection algorithms will be carried out in the monitoring and processing equipment SMP. The corresponding spectral analysis could likewise be carried out in the computer SP in which the expert software (installed in the substation SB) is included.

The invention claimed is:

1. A monitoring and processing equipment (SMP) for a wind turbine (Ai), the wind turbine including a control system (PLC), said equipment comprising:
   connection means with said control system (PLC) of the wind turbine, and
   connection means with a group of accelerometers (Si) placed in pre-established components (Ei, Mi and Gi) of the wind turbine,
said monitoring and processing equipment being configured to begin a capture of the signals of the group of accelerometers as long as predetermined operation variables of the wind turbine, received from the control system, are within a predetermined operation range, and
said monitoring and processing equipment being configured to complete said signal capture as long as the value of said operation variables does not vary, during the entire signal capture, beyond upper and lower limits configured in the equipment,
and said monitoring and processing equipment comprising:
   processing means for processing the captured signals of the accelerometers to obtain a set of overall variables associated to the captured signals, and
   means for generating alarms related to failures or malfunctionings of mechanical components of the wind turbine.

2. A monitoring and processing equipment according to claim 1, wherein said predetermined operation variables of the wind turbine (Ai) are the instantaneous power produced by the wind turbine, revolutions per minute of a generator (Gi), and rotation of a ring of the nacelle of the wind turbine.

3. A monitoring and processing equipment according to claim 1, wherein said predetermined ranges of the predetermined operation variables of the wind turbine are defined according to the rated features of the wind turbine (Ai).

4. A monitoring and processing equipment according to claim 1, wherein said upper and lower limits, for each operation variable, are determined by a percentage of the initial value of each variable.

5. A monitoring and processing equipment according to claim 1, wherein capturing the signal of the accelerometers consists of taking three consecutive samples: one for high-frequency processing (HF), one for low-frequency processing (BF), and one for digital filtering processing (FD).

6. A monitoring and processing equipment according to claim 1, wherein said processing means comprise:
   means for conditioning the signal,
   means for calculating a set of overall values,
   means for carrying out a level alarm detection algorithm; and
   means for carrying out a tendency alarm detection algorithm.

7. A monitoring and processing equipment according to claim 5, wherein said equipment can be configured with parameters obtained from means of alarm detection algorithms and the means of maximum frequencies and frequency bands.

8. A monitoring and processing equipment according to claim 1, further comprising storage means for storing the information introduced in or generated by the monitoring and processing equipment itself.

9. A monitoring and processing equipment according to claim 8, wherein said information stored in the storage means includes spectra, overall values, alarms, operation variables of the wind turbine, complete configuration of the equipment and overall variable and alarm recordings.

10. A monitoring and processing equipment according to claim 1, wherein said pre-established components of the wind turbine are a main shaft (Ei), step-up gear (Mi) and generator (Gi).

11. A predictive maintenance system for a wind park, the wind park comprising a group of wind turbines (Ai), a communications network (RS) and a supervision and control system (ST), wherein the predictive maintenance system comprises:
   a monitoring and processing equipment (SMPi) of the type claimed in claim 1, being connected to a control system (PLCi) of a wind turbine (Ai) such that the monitoring and processing equipment (SMPi) is configured to send alarms through the control system (PLCi) of a wind turbine to the supervision and control system (ST).

12. A predictive maintenance system according to claim 11, further comprising means for the spectral and vibration analysis (SP) of the information extracted from the monitoring and processing equipment (SMPi).

* * * * *

UNITED STATES PATENT AND TRADEMARK OFFICE
CERTIFICATE OF CORRECTION

PATENT NO. : 7,677,869 B2  Page 1 of 1
APPLICATION NO. : 10/578825
DATED : March 16, 2010
INVENTOR(S) : Maria Jose Martinez De Lizarduy Romo et al.

It is certified that error appears in the above-identified patent and that said Letters Patent is hereby corrected as shown below:

Title Page, item (30), Foreign Application Priority Data, "(EP)" should read --ES--

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,677,869 B2  Page 1 of 1
APPLICATION NO. : 10/578825
DATED : March 16, 2010
INVENTOR(S) : Maria Jose Martinez De Lizarduy Romo et al.

It is certified that error appears in the above-identified patent and that said Letters Patent is hereby corrected as shown below:

Title Page,
Item (30) Foreign Application Priority Data "EP" (deleted and replaced with "ES" in Certificate of Correction issued June 1, 2010) should be reinstated. The correct country abbreviation should read --EP--.

Signed and Sealed this
Twelfth Day of April, 2011

David J. Kappos
*Director of the United States Patent and Trademark Office*